United States Patent [19]

Loken et al.

[11] 4,372,410
[45] Feb. 8, 1983

[54] MODULAR INSTRUMENT CONSOLE

[75] Inventors: Arlin D. Loken; Leroy Luebkemann, both of Springfield, Ill.

[73] Assignee: Fiat-Allis Construction Machinery, Inc., Deerfield, Ill.

[21] Appl. No.: 205,787

[22] Filed: Nov. 10, 1980

[51] Int. Cl.³ .............................................. B62D 23/00
[52] U.S. Cl. .................................. 180/89.12; 180/90; 296/190
[58] Field of Search ................. 180/90, 321, 326, 327, 180/89.12; 73/37.9; 296/190

[56] References Cited

U.S. PATENT DOCUMENTS 3,174,576  3/1965  Woofter ................... 180/90
3,946,826  3/1976  Guhl ....................... 180/90
4,126,202 11/1978  Hern ....................... 180/90

Primary Examiner—Joseph F. Peters, Jr.
Assistant Examiner—John A. Carroll
Attorney, Agent, or Firm—Robert A. Brown

[57] ABSTRACT

A modular instrument console for a vehicle having an instrument panel supporting a plurality of modular instruments, gauges, and the like. The instrument panel is pivotally supported for access to the interior of the instrument console for servicing of the components therein. The instrument console is capable of being functionally attached to a vehicle in a temporary mounting prior to final assembly of the vehicle, or in its permanent position.

11 Claims, 3 Drawing Figures

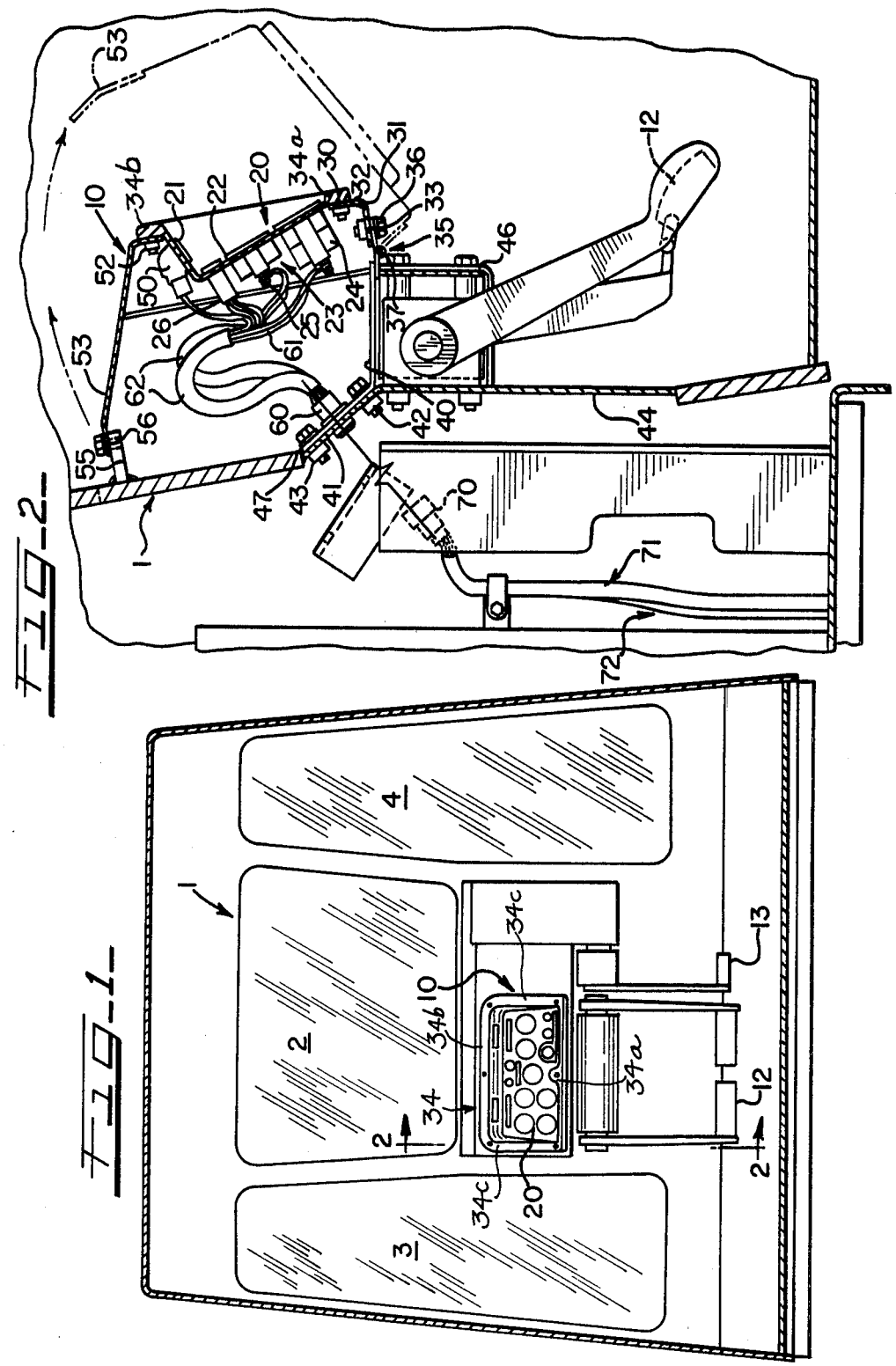

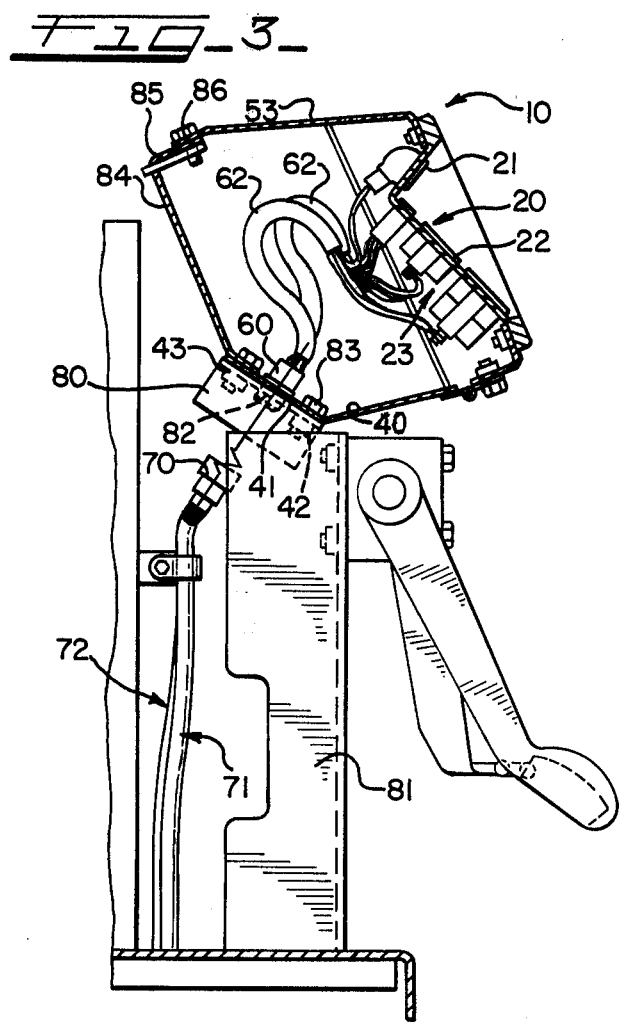

MODULAR INSTRUMENT CONSOLE

BACKGROUND OF THE INVENTION

This invention relates in general to vehicles and, in particular, to instrument consoles for vehicles.

More specifically, but without restriction to the particular use which is shown and described, the invention relates to a modular instrument console for use in a vehicle such as, for example, a tractor and the like. The modular instrument console includes means to attach it in a temporary operational position to a structural component of the vehicle, from which temporary position the vehicle may be operated and the console may be readily assembled into its permanent position in the vehicle cab or operator's compartment. The modular instrument console of the invention further includes a pivotal mounting providing enhanced access to the interior of the console for servicing.

As is well known, tractors and other similar vehicles used in construction and industrial machinery are typically provided with an instrument console for conveying vital information to the operator relating to the operational functions of the vehicle. In tractors and the like, the instrument console is generally situated in the operator's compartment or cab at a position directly in front of the operator's seat.

In the manufacture of such vehicles, it has become common practice to assemble certain major components, such as the cab or roll-over protective structure, commonly referred to as ROPS, at the destination site of the tractor rather than at the assembly plant. In view of this practice, it is difficult to operate the vehicle under its own power prior to the final assembly stage, due to important control and instrument components not being operatively coupled. The ability to control and monitor operation is extremely necessary to the handling and transporting of newly assembled vehicles at the assembly plant and at the point of destination. Known consoles are not provided with the capability of being operatively coupled to the vehicle, when the cab or ROPS structure has not been installed, to render the vehicle operational prior to complete assembly. In addition, prior art consoles do not provide a positive and reliable seal to keep noise and other environmental elements outside the cab. The instrument consoles employed in the prior art are also not optimumly suited to such separate stages of assembly, because they require considerable assembly of components that is difficult to perform at locations outside of the manufacturing facility.

After being permanently installed, such instrument consoles do not provide convenient access to the interior of the console for servicing of the components thereof, as needed in the field. Moreover, previous instrument consoles are generally of a design where their components are assembled in a rigid, unitized form and such assembly techniques do not permit bench testing of the gauges, lights and the like of the instrument panel or simplified bench assembly of the components. Examples of such typical prior art instrument consoles or panels are disclosed in G. Maguini, U.S. Pat. No. 3,910,371; K. Letzel, et al., U.S. Pat. No. 3,792,605; and R. E. Guhl, et al., U.S. Pat. No. 3,946,826.

SUMMARY OF THE INVENTION

It is, therefore, an object of this invention to improve instrument consoles used in vehicles.

Another object of this invention is to permit an instrument console to be attached to a vehicle at a temporary position prior to final installation of major components thereof.

A further object of the invention is to modularize the components of instrument consoles for easy assembly and servicing.

Another object of this invention is to improve access to the interior of the instrument console for needed servicing of the instruments and the like therein.

A further object of this invention is to provide a positive and reliable seal to keep noise and other environmental elements outside the cab and allow positive presurization inside the cab.

These and other objects are attained in accordance with the present invention, wherein there is provided an improved modular instrument console for use, for example, in the operator's compartment of a vehicle, such as a tractor and the like. The instrument console of the invention is capable of being attached to a structural component of the vehicle on a temporary basis to permit manipulation of the vehicle under its own power, prior to installation of major vehicle components, such as the cab or ROPS structure and the like. The modular design of the instrument console herein disclosed facilitates assembly of the instrument console and permits convenient bench testing of the component instruments, gauges and the like. The modular instrument console of the invention is further provided with a hinged instrument panel for ready service access to the instruments, circuitry and other components.

BRIEF DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout wherein:

FIG. 1 is a front view of the operator's compartment of a vehicle employing the improved modular instrument console of the invention;

FIG. 2 is an enlarged end sectional view of the modular instrument console of the invention taken along lines 2—2 of FIG. 1 illustrating its permanent installed position on the vehicle; and FIG. 3 is an end sectional view of the modular instrument console of the invention of FIG. 2 illustrating its temporary position on the vehicle prior to installation of the cab or ROPS structure.

DESCRIPTION OF A PREFERRED EMBODIMENT

Referring now to FIG. 1, there is illustrated a front view, directly in front of the operator's seat, of the front wall assembly 1 of the cab or operator's compartment of a vehicle, such as a tractor and the like employed in construction or industrial machinery. The front wall assembly 1 includes a conventional center windshield 2 and a pair of side windshields 3 and 4. The modular instrument console 10 of the invention is supported in permanent installation on the front wall assembly 1 in a manner to be described.

Foot control levers 12 and 13, to perform conventional operative functions, are pivotally mounted in a known manner beneath the modular instrument console 10 for manipulation by an operator during operation of the vehicle. In FIG. 2, the modular instrument console 10 is illustrated in its permanent installed position in the operator's cab. In FIG. 3, a temporary position of the modular instrument console 10 is shown for purposes to be described in detail in the following description.

In the permanent position shown in FIG. 2, the modular instrument console 10 includes a dash panel 20 extending substantially the width of the console 10. The dash panel 20 has a L-shaped cross-sectional configuration to form an upper angularly disposed portion 21 and an instrument receiving portion 22. The instrument receiving portion 22 of the dash panel 20 supports a plurality of instruments 23, having separate modular forms of any conventional design that are secured through suitably shaped openings formed in dash panel portion 22. The instruments 23 are affixed to the instrument panel 20 in a manner to permit the operator to view the indicia, gauges or lights of the console during operation of the vehicle. Although instruments 23 may constitute a wide variety of gauges and the like, a fuel gauge 24, an engine water temperature gauge 25, and warning lights 26 are shown in FIG. 2 to advise the operator of particular vehicle functions. Numerous other warning lights, switches, gauges and instruments, as shown generally in FIG. 1, may suitably be arranged in support on the instrument panel 20.

The bottom portion of instrument panel 20 is secured by two or more threaded bolt assemblies 30 (one of which is shown in FIG. 2) to a console pivot bracket 31, having an elongated configuration and including a pair of angularly disposed portions 32 and 33. The bolt assemblies 30 attach the panel 20 to the console pivot bracket 31 by extending through corresponding openings in the bracket portion 32 and corresponding openings provided in a frame structure 34 integrally projecting from the instrument panel 20 in surrounding relationship thereto. The frame structure 34 includes an interconnected lower horizontal portion 34a, upper horizontal portion 34b, and a pair of vertical portions 34c as best shown in FIG. 1. The other bracket portion 33 is affixed to a pivot assembly 35 by means of suitable bolt assemblies 36. Pivot assembly 35 is of a conventional design permitting pivoting of the panel 20 about an axis established by an elongated pivot pin or series of pins 37.

The pivot assembly 35 is retained on the vehicle, as shown in FIG. 2, by means of a bulk head panel 40 forming the underside of the modular instrument panel 10. In its permanent position of installation on the vehicle as shown in FIG. 2, the bulk head panel 40 includes a sloped end portion 41 that is attached, by a respective plurality of bolt assemblies 42 and 43, to a cab partial wall 44, extending upward in retained position from the front wall assembly 1 of the cab, and to brackets 47. The vehicle control levers 12 are mounted on a housing 46 suitably affixed to the cab wall 44 directly beneath the bulk head panel 40. The upper threaded bolt assemblies 43 are disposed through the bolt receiving brackets 47 suitably retained on the cab front wall assembly 1 by any technique, such as by welding and the like.

The upper portion 21 of the instrument panel 20 includes one or more dash lights 50, which extend through the instrument panel and provide illumination of the instrument receiving surface 22 for enhanced visualization thereof. The upper portion 34b of the frame structure 34 of the instrument panel 20 is attached by a plurality of bolt assemblies 52 (one of which is shown in FIG. 2) to an upper cowl 53 of the instrument console 10. The upper cowl 53 is retained by an elongated bracket 55 suitably affixed by welding and the like to the cab front wall assembly 1. The upper cowl 53 is secured to the elongated bracket 55 by means of a plurality of threaded bolt assemblies 56, one of which is shown in FIG. 2. The instrument console 10 may be provided with end walls (not shown), such that the instruments 23 and associated circuitry or fluid lines are enclosed within the instrument console.

The instruments 23 are coupled to respective operating transducers (not shown) generating signals representative of selected vehicle parameters, or to electrical power sources of the vehicle. Such coupling is facilitated by means of a plurality of bulkhead fittings, such as, the fittings 60 shown on the bulkhead panel 40 in FIG. 2. The fittings 60 may comprise a two part conduit assembly, coupling the instruments 23 through suitable electrical or fluid lines 61 carried in the conduits 62. The conduits 62 extend to corresponding quick disconnect fittings 70, which are coupled to various vehicle transducers by suitable lines carried in consuit assemblies 71 and 72. The bulkhead panel 40 may also include other fittings needed to supply signals to the instruments or gauges 23, whether electrical or pressure signals, dependent on the particular instruments of the vehicle.

Service access to the instruments 23 is readily possible in the modular instrument console 10 of the invention. The plurality of upper bolt assemblies 56 may simply be removed, and the instrument console 10 swung downward into the position shown in phantom in FIG. 2. In the service position, accessibility to the modular instruments, guages, lights, and associated circuitry within the console 10 is thus provided. The instrument console 10 may also include a suitable vandal-proof cover (not shown) to protect the interior of the instrument console 10 from unauthorized access and tampering.

Referring to FIG. 3, there is shown the modular instrument console 10 in its temporary position, prior to permanent installation on the vehicle. The mounting illustrated in FIG. 3 permits the vehicle to be operated prior to the cab or ROPS structure being physically mounted on the vehicle. The attachment of the cab or ROPS structure to a tractor and the like is commonly performed at the point of destination of such vehicles. However, it is desirable that the vehicle can be maneuvered under its own power, despite the fact that major components, such as the cab or ROPS structure, are not actually installed.

In FIG. 3, the cab or ROPS structure is not in place on the vehicle, and the modular instrument console 10 is mounted in a temporary position in accordance with the invention. An L-shaped bracket 80, attached to the vehicle chassis on a structural component 81 by any suitable technique, is employed to act as support for the console 10. The bulk head panel 40 is attached to a leg 82 of the bracket 80 by threaded bolt assemblies 83 to secure the panel in place. A back plate 84 is further attached to the bracket 80 and includes an upper flange 85, which is attached by threaded members 86 to the upper cowl 53 of the console 10.

From the foregoing, it should be apparent that the console 10 in FIG. 3 is rigidly retained on the vehicle without being attached to the cab or ROPS structure.

Since the quick disconnect fittings 70 may selectively be coupled to bulk head fittings 60 in the temporary position of the console 10 illustrated in FIG. 3, the vehicle may be manuevered under its own power in conjunction with instrument console 10 without the presence of the cab or ROPS structure, or other components that may be installed at the point of destination.

During the final assembly of the tractor and the like to mount such components as the cab or ROPS structure, the bolt assemblies 83 and 86 are removed, and the modular instrument console 10 is attached to the erected cab in the manner described with reference to FIG. 2 illustrating the permanent position of the console. As shown in FIG. 2, the back plate 84 is removed and disposed of and the cowl 53 attached to bracket 55 so that the instrument console 10 is in its permanent installed position. The presence of the quick disconnect fittings 70 facilitates the temporary disconnection from the bulkhead fittings 60 and subsequent reconnection after final installation of the modular instrument console 10 of the invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An instrument console for alternate mounting in combination with a vehicle comprising
    panel means having a plurality of instrument means operatively coupled to respective output signals reflective of functional operation of the vehicle,
    enclosure means coupled to said panel means to enclose said plurality of instrument means and permit viewing operation of said instrument means,
    temporary attachment means for temporarily affixing said enclosure means to the vehicle prior to permanent installation of said enclosure means in an operator compartment of the vehicle, said instrument means being adapted to be operatively coupled to the vehicle output signals during said temporary attachment, and
    permanent attachment means for permanently affixing said enclosure means within the operator's compartment after said operator's compartment has been installed on the vehicle.

2. The combination of claim 1 wherein said panel means includes a panel member supporting said instrument means.

3. The combination of claim 2 wherein said panel member is pivotally attached to said enclosure means to provide access to said instrument means for service.

4. The combination of claim 1 wherein said enclosure means includes a bulk head member coupled to said panel means and adapted to be attached to said temporary attachment means prior to installation of the operator's compartment and to said permanent attachment means after installation of the operator's compartment.

5. The combination of claim 4 wherein said enclosure means further includes a cowl member coupled to said panel means and adapted to be attached to said temporary attachment means prior to installation of the operator's compartment and to be attached to said permanent attachment means after installation of said operator's compartment.

6. The combination of claim 1 wherein said instrument means includes a plurality of separate modular components.

7. The combination of claim 6 wherein said instrument means further includes signal transmission means coupled to said modular components and adapted to supply output signals thereto representative of functional operation of the vehicle.

8. The combination of claim 7 wherein said signal transmission means includes separable coupling means to permit selective coupling and de-coupling of the signal transmission means to said modular components.

9. The combination of claim 1 wherein said temporary attachment means includes a bracket means attached to the vehicle.

10. The combination of claim 9 wherein said temporary attachment means includes a plate means adapted to be attached to said bracket means and said enclosure means.

11. The combination of claim 1 wherein said permanent attachment means includes bolt assembly means attaching said enclosure means to a portion of the operator's compartment of the vehicle.

* * * * *